United States Patent
Mackey et al.

(10) Patent No.: US 12,306,695 B2
(45) Date of Patent: May 20, 2025

(54) SYSTEM AGNOSTIC AUTONOMOUS SYSTEM STATE MANAGEMENT

(71) Applicants: Advanced Micro Devices, Inc., Santa Clara, CA (US); ATI Technologies ULC, Markham (CA)

(72) Inventors: Paul A. Mackey, Austin, TX (US); Michael John Austin, Austin, TX (US); Xinzhe Li, Markham (CA); Alexander S. Duenas, Markham (CA); Davis Matthew Castillo, Austin, TX (US); Ashwini Chandrashekhara Holla, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 112 days.

(21) Appl. No.: 18/312,522

(22) Filed: May 4, 2023

(65) Prior Publication Data
US 2024/0370077 A1  Nov. 7, 2024

(51) Int. Cl.
*G06F 1/32* (2019.01)
*G06F 1/3206* (2019.01)
*G06F 1/3296* (2019.01)

(52) U.S. Cl.
CPC ......... *G06F 1/3296* (2013.01); *G06F 1/3206* (2013.01)

(58) Field of Classification Search
CPC .............................. G06F 1/3296; G06F 1/3206
See application file for complete search history.

(56) References Cited

U.S. PATENT DOCUMENTS

| | | | |
|---|---|---|---|
| 2010/0115343 A1* | 5/2010 | Floyd | G06F 11/3466 714/39 |
| 2011/0161981 A1* | 6/2011 | Van De Ven | G06F 9/4843 718/107 |
| 2015/0106601 A1* | 4/2015 | Ye | G06F 9/50 712/229 |

* cited by examiner

*Primary Examiner* — Stefan Stoynov
(74) *Attorney, Agent, or Firm* — Volpe Koenig (57) ABSTRACT

A computing device is provided which comprises memory and a processor in communication with the memory. The processor is configured to autonomously acquire input parameter values, comprising one of monitored device input parameter values from a component of the computing device and monitored user input parameter values. The processor is also configured to select, from a plurality of modes of operation, a mode of operation comprising parameter settings which are determined based on the acquired input parameter values, each of the plurality of modes of operation comprising different parameter settings configured to control the computing device to operate at a different level of performance. The processor is also configured to control operation of the computing device by tuning the parameter settings of the computing device according to the selected mode of operation comprising the determined parameter settings.

12 Claims, 7 Drawing Sheets

| Mode of Operation | Ergonomics (Skin Temp, Fan noise) | Perf Level (% of Max) |
|---|---|---|
| High Performance | 42 degrees Celsius, 35 dBA | 100% |
| Balanced Performance Ergonomic | 40 degrees Celsius, 28 dBA | 85% |
| Virtually Silent | 40 degrees Celsius, 25 dBA | 75% |
| Cool | 38 degrees Celsius, 27 dBA | 75% |
| Silent | 40 degrees Celsius, 20 dBA | 65% |
| Super Cool | 38 degrees Celsius, 25 dBA | 65% |

SYSTEM AGNOSTIC AUTONOMOUS SYSTEM STATE MANAGEMENT

BACKGROUND

Systems are increasingly integrating large numbers of different types of components on a single chip or on multi-chip modules. The complexity of power consumption and performance of a system increases with the number of different types of components. Efficiency and performance management are important aspects of the design and operation of integrated circuits. For example, efficient use of power is important for circuits that are integrated within devices which typically rely on battery power, such as mobile devices because reducing power consumption in the integrated circuits of these devices can increase the life of the battery as well as decrease the heat generated by the integrated circuits.

BRIEF DESCRIPTION OF THE DRAWINGS

A more detailed understanding can be had from the following description, given by way of example in conjunction with the accompanying drawings wherein.

DETAILED DESCRIPTION

Various factors contribute to the efficiency and performance of a computing device (e.g., personal computer and its peripherals). Conventional devices operate in static state configurations each favoring one of performance, power consumption, temperature and device noise level. For example, some conventional devices allow a user to manually select (e.g., toggle) system parameters. However, these conventional devices are not autonomous or adaptable to different system variables because they are static state configurations.

Some conventional devices include runtime application-based functions which have mechanisms to change power levels in response to non-OS related stimuli (e.g., remaining battery power). Other conventional devices include limited system state and metric awareness added to the baseline OS functionality. For example, these conventional devices rely upon embedded controller hardware to manage system states. However, conventional devices are limited to only monitoring input parameters directly connected to a controller and, therefore, provide a limited number of different modes of operation which do not account for a wide range of input parameters. In addition, these conventional devices make decisions on these modes of operation using simple binary comparisons, restricting the decision making quality.

Features of the present disclosure include computing devices and methods for managing the efficiency and performance of the computing device by utilizing a system-state management (ASM) driver (referred to herein interchangeably as "ASM" or "ASM driver"). The ASM interfaces between the operating system (OS) of the device and firmware (used to control operation of device hardware) to manage the efficiency and performance of the device better than just relying on the OS of the device and firmware. That is, the ASM is utilized to operate the computing device at a level that is both power efficient (e.g., cooler system temperature and less noise) and energy efficient (e.g., longer battery life) while maintaining a performance of the computing device. The ASM maintains the performance of the computing device by first prioritizing responsiveness (e.g., preventing delays between user input and device response, maintaining video or audio quality such as preventing stuttering, and maintaining other types of responsiveness) of the computing device and secondarily prioritizing the overall speed of the computing device.

Features of the present disclosure utilize the ASM to autonomously (dynamically) select between different modes of operation for the computing device (e.g., different states of the computing device) based on a variety of monitored input parameters (in contrast to being implemented by the OS of the computing device). Each mode of operation provides a different level of performance and includes different parameter settings (e.g., firmware parameter settings) used to control operation of different components of the computing device (e.g., a cooling system component). The number and type of selectable modes of operation are adaptable to different devices and vary depending on the supporting resources of the computing device (e.g., type of fan, resources for supporting different power levels at different skin temperatures and other resources).

Features of the present disclosure utilize the ASM to select between the different modes of operation by first detecting a performance mode of a computing device and selecting a performance level threshold that is assigned to each performance mode of the device. For example, as described in more detail herein, the ASM is utilized to detect whether a device is: (1) in a first performance mode in which a single application, executing on the device, is identified as a high performance application (e.g., a type of application which executes using a large number of memory accesses by a processor over a period of time or a number of clock cycles); or (2) in a second performance mode in which multiple applications are currently executing on the device which are not identified as high performance applications (e.g., multi-tasking). Each different performance level threshold, assigned to a performance mode, can include a single performance level threshold for the device or multiple performance level thresholds for different processors of the device (e.g., a performance level threshold for a CPU, and a performance level threshold for a GPU).

The present application provides a computing device comprising memory and a processor in communication with the memory. The processor is configured to acquire input parameter values, comprising one of monitored device input parameter values from a component of the device and monitored user input parameter values. The processor is also configured to select, from a plurality of modes of operation, a mode of operation comprising parameter settings which are determined based on the acquired input parameter values, each of the plurality of modes of operation comprising different parameter settings configured to control the computing device to operate at a different level of performance. The processor is further configured to control operation of the device by tuning the parameter settings of the device according to the selected mode of operation.

The present application provides a method for managing efficiency and performance of a computing device. The method comprises acquiring input parameter values, comprising one of monitored device input parameter values from a component of the device and monitored user input parameter values. The method also comprises selecting, from a plurality of modes of operation, a mode of operation which comprises parameter settings which are determined based on the acquired input parameter values, each of the plurality of modes of operation comprising different parameter settings configured to control the computing device to operate at a different level of performance. The method further comprises controlling operation of the device by tuning the parameter settings of the device according to the selected mode of operation.

The present application provides a computing device comprising memory and a processor in communication with the memory, configured to acquire monitored input parameter values, detect a performance mode of the device, select a performance level threshold of the device based on the detected performance mode, select one of a plurality of modes of operation of the device based on the performance level threshold and a current performance level of the device and control operation of the device by tuning parameter settings of the device according to the selected mode of operation.

The present application provides a method for managing efficiency and performance of a computing device comprising acquiring monitored input parameter values, detecting a performance mode of the device, selecting a performance level threshold of the device based on the detected performance mode, selecting one of a plurality of modes of operation of the device based on the performance level threshold and a current performance level of the device and controlling operation of the device by tuning parameter settings of the device according to the selected mode of operation.

As used herein, programs includes any sequence of instructions to be executed using one or more processors to perform procedures or routines (e.g., operations, computations, functions, processes, jobs). As used herein, execution of programmed instructions (e.g., applications, drivers, operating systems or other software) on a processor includes any of a plurality of stages, such as but not limited to fetching, decoding, scheduling for execution, beginning execution and execution of a particular portion (e.g., rendering of video on full screen) of the programmed instructions. Programmed instructions include parameter settings (e.g., hardware parameter settings) and parameters (e.g., hardware parameters) having tunable (i.e., changeable) values used to control operation of hardware.

Figure 1:
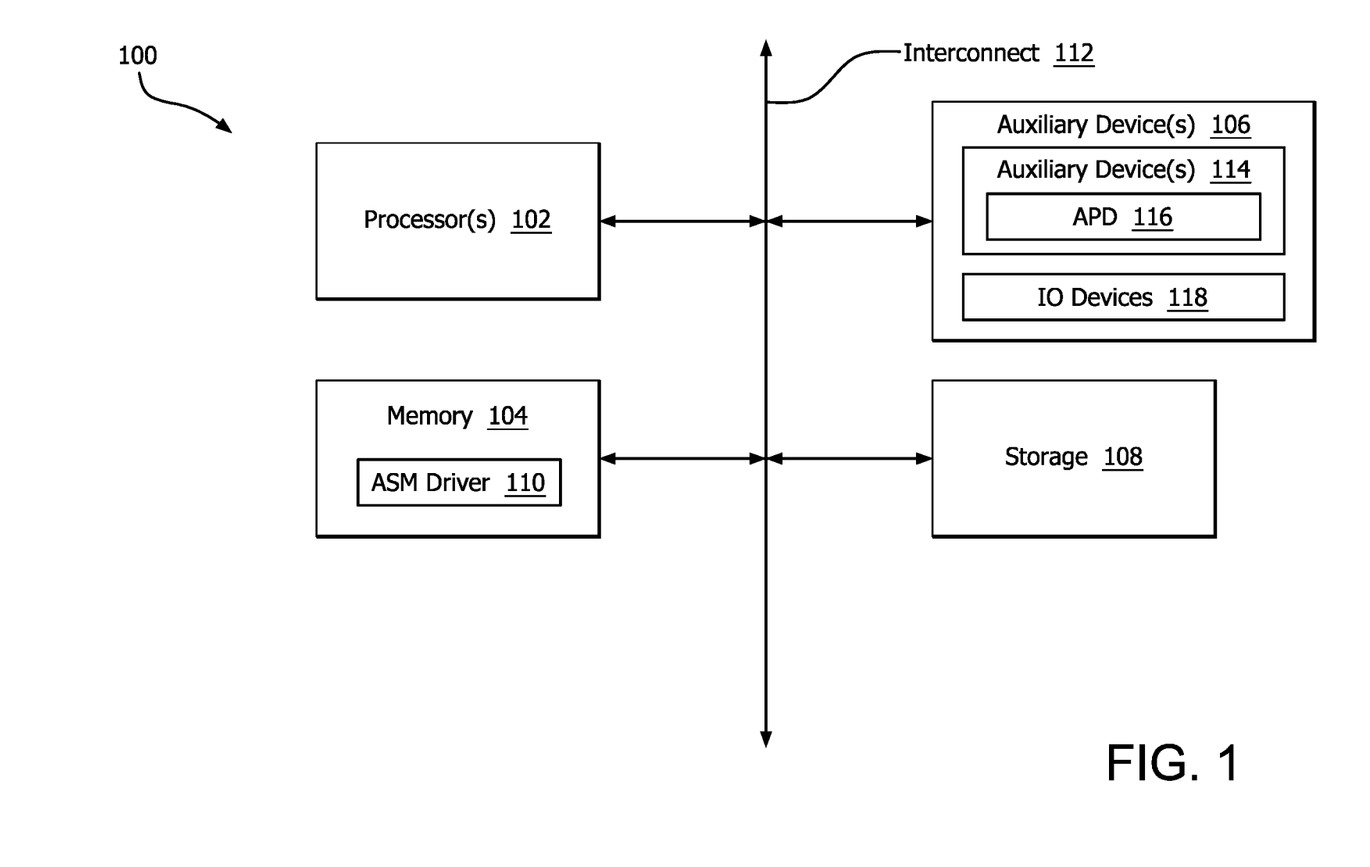
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106 and storage 108.

As shown in FIG. 1, memory 104 includes an autonomous system-state management (ASM) driver 110. An interconnect 112, which can be a bus, a combination of buses, and/or any other communication component, communicatively links the processor(s) 102, the memory 104, the auxiliary device(s) 106 and the storage 108. The ASM driver 110 comprises instructions (e.g., software) executed by the processor 102 to perform the operations described herein.

In various alternatives, the processor(s) 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the processor(s) 102, such as on the same chip or in an interposer arrangement, and/or at least part of the memory 104 is located separately from the processor(s) 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The auxiliary device(s) 106 include, without limitation, one or more auxiliary processors 114, and/or one or more input/output ("IO") devices. The auxiliary processor(s) 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor. In some examples, the auxiliary processor(s) 114 include an accelerated processing device ("APD") 116. In addition, although processor(s) 102 and APD 116 are shown separately in FIG. 1, in some examples, processor(s) 102 and APD 116 may be on the same chip.

The one or more IO devices 118 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

Figure 2:
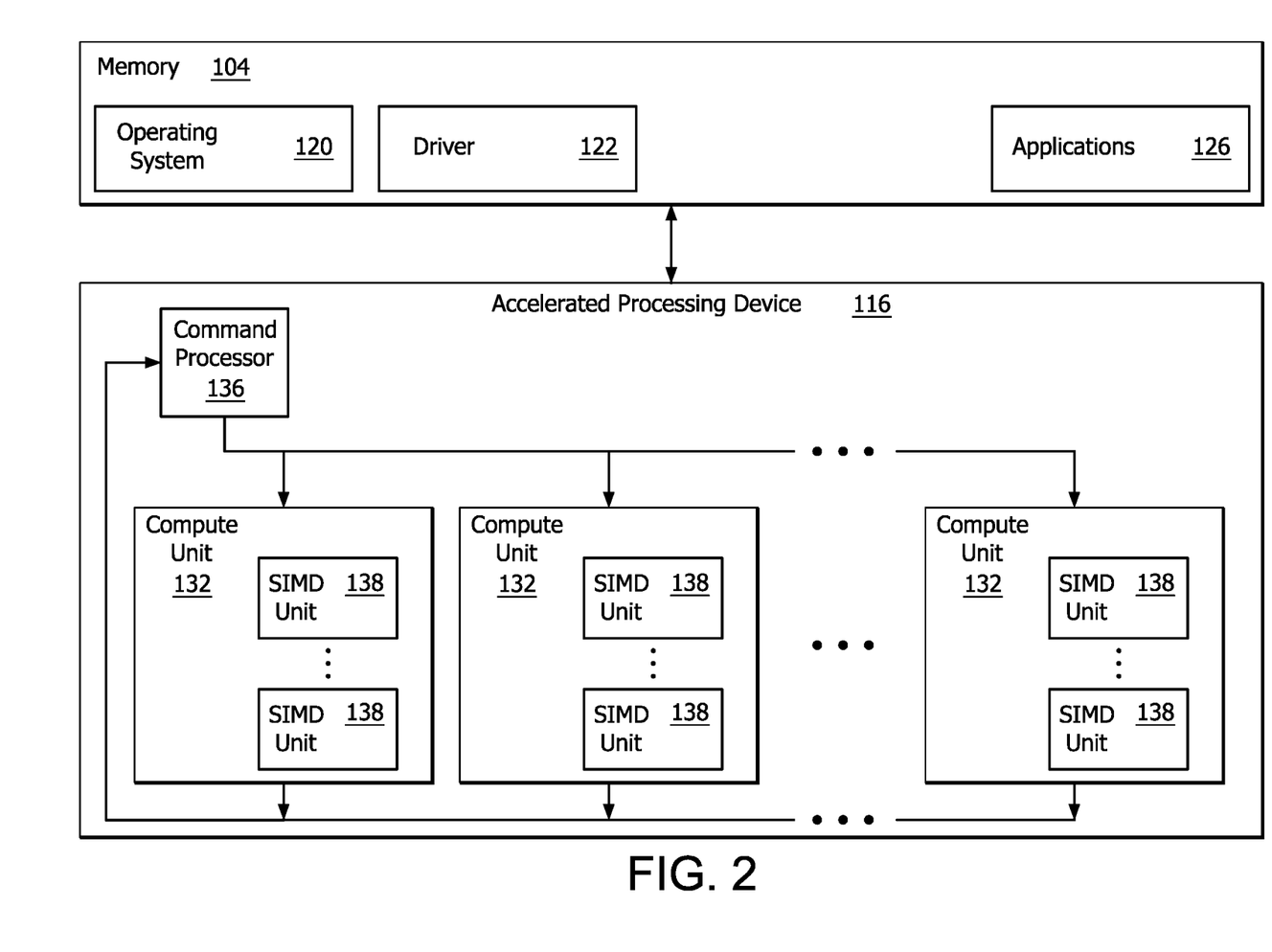
FIG. 2 is a block diagram of the device, illustrating additional details related to execution of processing tasks on the APD, according to an example.

FIG. 2 is a block diagram of the device 100, illustrating additional details related to execution of processing tasks on the APD 116, according to an example. The processor 102 maintains, in system memory 104, one or more control logic modules for execution by the processor(s) 102. The control logic modules include an operating system 120, a driver 122, and applications 126, and may optionally include other modules not shown. These control logic modules control various aspects of the operation of the processor(s) 102 and the APD 116. For example, the operating system 120 directly communicates with hardware and provides an interface to the hardware for other software executing on the processor(s) 102. The driver 122 controls operation of the APD 116 by, for example, providing an application programming interface ("API") to software (e.g., applications 126) executing on the processor(s) 102 to access various functionality of the APD 116. The driver 122 also includes a just-in-time compiler that compiles shader code into shader programs for execution by processing components of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to a display device (e.g., one of the IO devices 118) based on commands received from the processor(s) 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline, or that are completely unrelated to graphics operations (sometimes referred to as "GPGPU" or "general purpose graphics processing unit"). FIG. 2 merely illustrates an example of an APD 116 that includes compute units 132 having single instruction, multiple data (SIMD) units 138 that are configured to perform operations in a parallel manner according to a SIMD paradigm. In this example, a command processor 136 launches wavefronts based on work (e.g., execution tasks) that is waiting to be completed and is configured to perform operations related to scheduling various wavefronts on different compute units 132 and SIMD units 138. Features of the present disclosure can be implemented, however, for a computing device having an APD without any SIMDs. The computing device can also include an APD which is a CPU or another type of processor (e.g., a dedicated microcontroller). Features of the present disclosure can also be implemented for a computing device without any APD.

Figure 3:
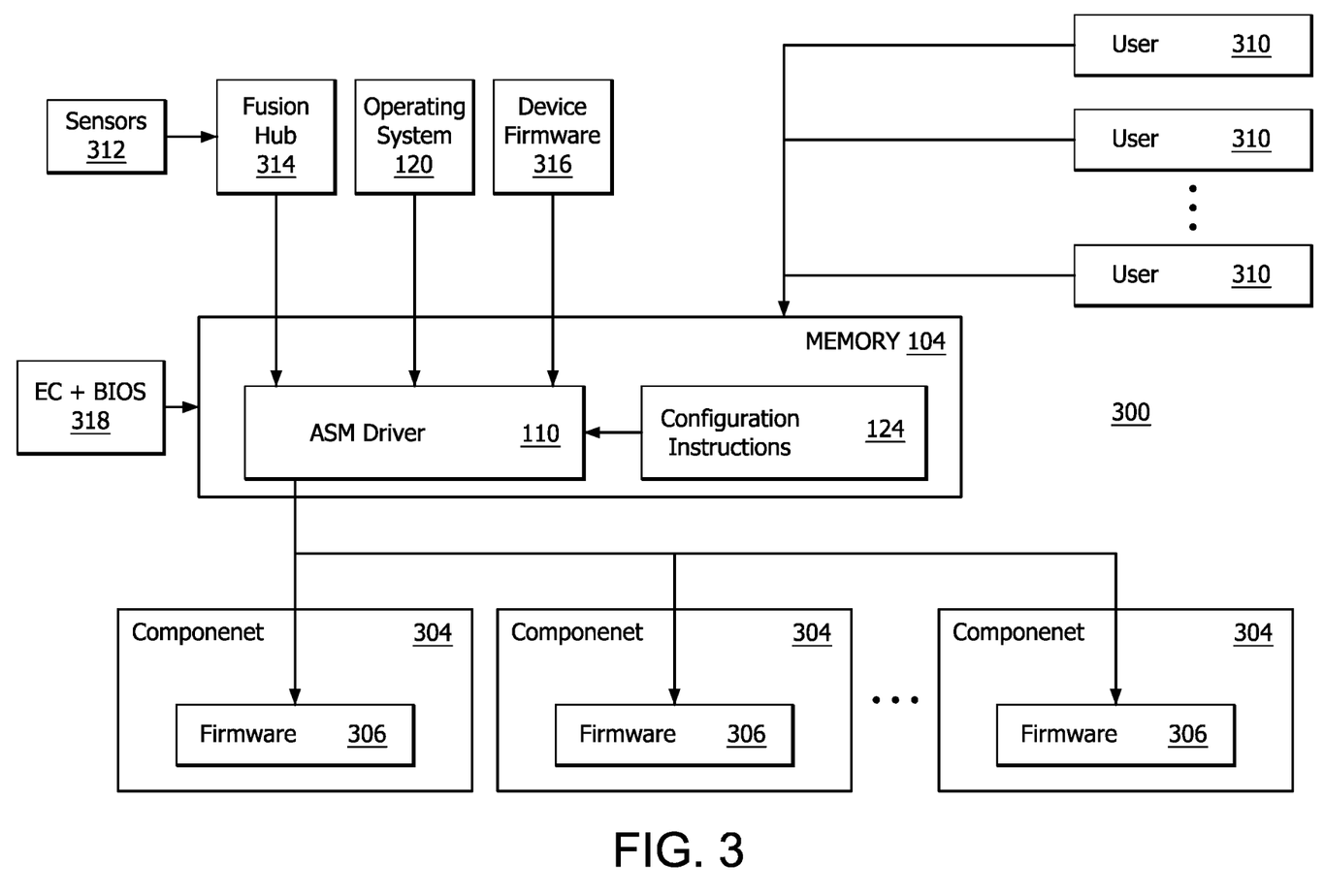
FIG. 3 is a block diagram illustrating example components and information flow of a computing device in which efficiency and performance is managed according to features of the present disclosure.

FIG. 3 is a block diagram illustrating example components and information flow of a computing device 300 in which efficiency and performance is autonomously managed according to features of the present disclosure. In various examples, the computing device 300 is one of, but is not limited to, for example, a computer, a gaming device, a handheld device, a mobile phone, a tablet computer, or other computing device. The number of components and types of components of the device 300 is merely an example used for simplified explanation. Features of the present disclosure can be implemented for devices having additional components and component types other than those shown in FIG. 3.

As shown in FIG. 3, the memory 104 of the device 300 comprises the ASM driver 110 and configuration instructions 124. The ASM driver 110 is in communication with a plurality of input components, which include operating system 120, sensors 312, sensor fusion hub 314, device firmware 316 and embedded controller (EC) and Basic Input/Output System (BIOS) 318.

Sensors 312 include, for example, a camera, a motion detector, a thermal sensor, or other sensors which acquire the input parameters used to manage the efficiency and performance of the device 300.

The ASM driver 110 is also in communication with a plurality of components 304. Each of the components 304 is an example of a different hardware component of device 300. For example, the components 304 include hardware used to control operation of a display device, speakers, a fan, processor 102, one or more auxiliary processors 114 (e.g., APD 116).

The ASM driver 110 is used to interface between the OS 120 and the firmware 306. The input parameters, acquired from the plurality of input components, are continuously monitored (e.g., over predetermined clock cycles or a predetermined period of time). The APD 116 determines, based on the combination of currently monitored input parameters, whether to maintain or switch to a different mode of operation (e.g., a stored mode of operation having input parameters which most closely matches the current plurality of monitored input parameters), as a mode of operation to be selected. In response to determining that the mode of operation should be switched to a different mode of operation, the configuration instructions 124 are updated with the parameter settings for the newly determined mode of operation of the device 300.

Tuning is performed by setting the values of parameters for a selected mode of operation according to the parameter settings stored in the configuration instructions 124 for the particular user 310. For example, in response to determining that the mode of operation should be switched to a different mode of operation, a processor (e.g., any processor of the device, such as processor 102 or an auxiliary processor 114) controls the operation of the device by tuning one or more parameter settings (e.g., parameter settings of firmware 306 to control operation of a cooling system device, such as fan speed parameters to control operation of a fan) according to the parameter settings stored in the configuration instructions 124 for the selected mode of operation. Modes of operation can include parameter settings tailored to an individual user of a device based on the acquired input parameters.

Firmware 306 includes hardware parameters and associated values to control operation of hardware (e.g., fan) of the device 304 and provide an interface between the hardware (e.g., fan) of the device 304 and the ASM driver 110. Firmware is stored in non-volatile memory (e.g., a harddisk, motherboard boot read only memory (ROM), and BIOS memory). The firmware 306 is used, along with the ASM driver 110, to control operation of hardware of device 300.

In one example, the configuration instructions 124 also includes parameter settings for modes of operation for each of a plurality of identified users 310 operating the device 300. For example, the APD 116 determines, based on the combination of currently monitored input parameters, whether to maintain or switch to a different mode of operation (e.g., a stored mode of operation having input parameters which most closely matches the current plurality of monitored input parameters for an identified user 310), as a mode of operation to be selected. For example, when a specific user 310 is identified, device driver 122 parses the configuration instructions 124 and reads the settings from the configuration instructions 124 for the selected mode of operation and the identified user 310. Tuning is then performed, by setting the values of parameters for a selected mode of operation according to the parameter settings stored in the configuration instructions 124 for the particular user 310. Modes of operation can include parameter settings tailored to an individual user of a device based on the acquired input parameters.

The parameter settings include, but are not limited to, one or more parameters used to control operation, such as parameters for controlling the cooling system of a device (e.g., fan power parameters, fan speed parameters, fan level parameters), parameters for controlling the display of images or video, parameters for controlling the sound provided by the device. Examples of parameters used to control operation of the device include, but are not limited to parameters used to control fan speed, compressing video and audio data (e.g., sampling rate, frame rate), dynamic range, frequency response, reverb, equalization, gain, frequency response, removal of ambient/acoustic noise (e.g., fan noise), video graphics rendering, filtering, video, color sensitivity, color sensitivity, flicker, compression artifacts, speed of operations, memory usage, bandwidth, dynamic power management (DPM) parameters (e.g., clock speed parameters, clock voltage parameters, and clock gating parameters), memory timing parameters and parameters for amounts of heat generated (e.g., thermal design power (TDP)).

Examples of parameter settings which are tuned, based on input parameter settings, to select a mode of operation for managing the efficiency and performance of a device include, but are not limited to, settings for fan power, fan speed or fan level, frame rate, frequency response, volume, equalization, light level, power consumption, bandwidth usage, latency, quality (e.g., visual quality and audio quality), the type of component (e.g., type of processor or core, type of processor core engine) used to process data, cost of components (e.g., memory and storage), cost of devices used with the computing devices (e.g., cost of speakers), and opportunity costs (e.g., cost of using one or more resources to perform functions in order to free up one or more other resources to perform other functions). The input parameters may also include parameters for a specific application (not shown) or type of application executing on the device 300. For example, the parameters may include previously stored input parameters for the application (e.g., identified via an application names or API), such as parameters indicating various functionality of the processor used to execute the application or type of application. In addition, based on the input parameters, the parameter settings of a device can be tuned to reduce costs external to the computing device (e.g., costs to a server or a provider which provides information (e.g., streaming video) to the device.

Figure 4:
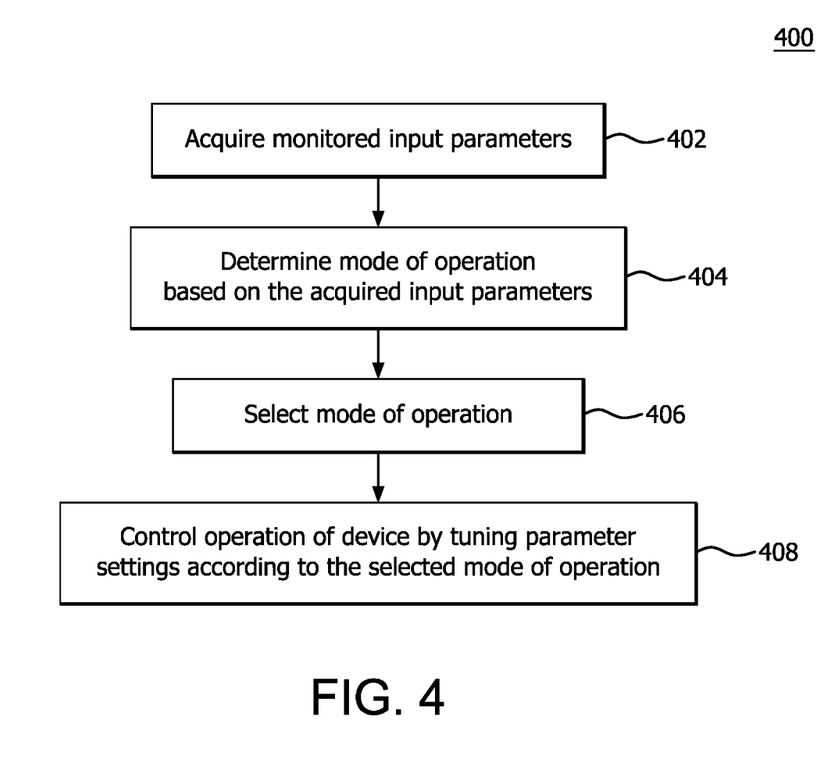
FIG. 4 is a flow diagram illustrating an example method of managing efficiency and performance of a computing device according to features of the present disclosure.

FIG. 4 a flow diagram 400 illustrating an example method of managing efficiency and performance of a computing device (e.g., computing device 300).

As shown at block 402 of FIG. 4, the method 400 includes acquiring monitored input parameters to a device. The input parameters are monitored by one or more processors (e.g., any type of processor, such as processor(s) 102, or auxiliary processor(s) 114). The input parameters include, for example, parameters acquired by operating system 120, parameters from components 304, sensed parameters by sensors 312 via sensor fusion hub 314 (or parameters directly from sensors 312), device firmware 316 (e.g., firmware used to manage power of the device) as well as parameters from embedded controller (EC) and BIOS 318). The parameters are continuously monitored (e.g., over predetermined clock cycles or a predetermined period of time).

As shown at block 404 of FIG. 4, the method 400 includes determining a mode of operation based on the acquired monitored input parameters. A processor (e.g., any processor of the device, such as processor 102 or an auxiliary processor 114) of the device determines, based on the combination of currently monitored input parameters, whether to maintain or switch to a different mode of operation. For example, each mode of operation includes a different combination of settings for parameters (e.g., cooling system parameters or other device parameters) of the device. Based on the combination of currently monitored input parameters, the processor executes instructions by the ASM driver to perform computation tasks and determine which mode of operation to select (i.e., which combination of parameters settings is to be used). For example, computation tasks are performed to determine which operation mode (e.g., level of performance) to select based on a plurality of input parameters, including ergonomic parameters such as skin temperature of the device and fan noise.

In an example, a plurality of modes of operation are stored (e.g., in memory 104), each including a combination of input parameter (e.g. each parameter having a range of input parameter values) and a combination of parameter settings (e.g., settings for cooling system parameters or other device parameters). Accordingly, the processor (e.g., any processor of the device, such as processor 102 or an auxiliary processor 114) compares the combination of currently monitored input parameters to the stored input parameters corresponding to each of the different modes of operation and determines a mode of operation which includes stored input parameters that most closely match (e.g., within a threshold range) the current combination of monitored input parameters. The parameter settings for a plurality of modes of operation can be stored, for example, in the configuration instructions shown 124 in FIG. 3).

In another example, the processor determines a mode of operation to be selected by making one or more decisions regarding different input parameters, as described in more detail below with regard to FIG. 6.

As shown at block 406 of FIG. 4, the method 400 includes selecting, from a plurality of modes of operation, a mode of operation comprising parameter settings which are determined based on the acquired input parameter values. Each of the plurality of modes of operation comprises different parameter settings configured to control the computing device (e.g., computing device 300) to operate at a different level of performance. For example, based on acquired input parameter values, a processor (e.g., processor 102 or an auxiliary processor 114) selects one of the modes of operation shown in FIG. 5.

Figure 5:
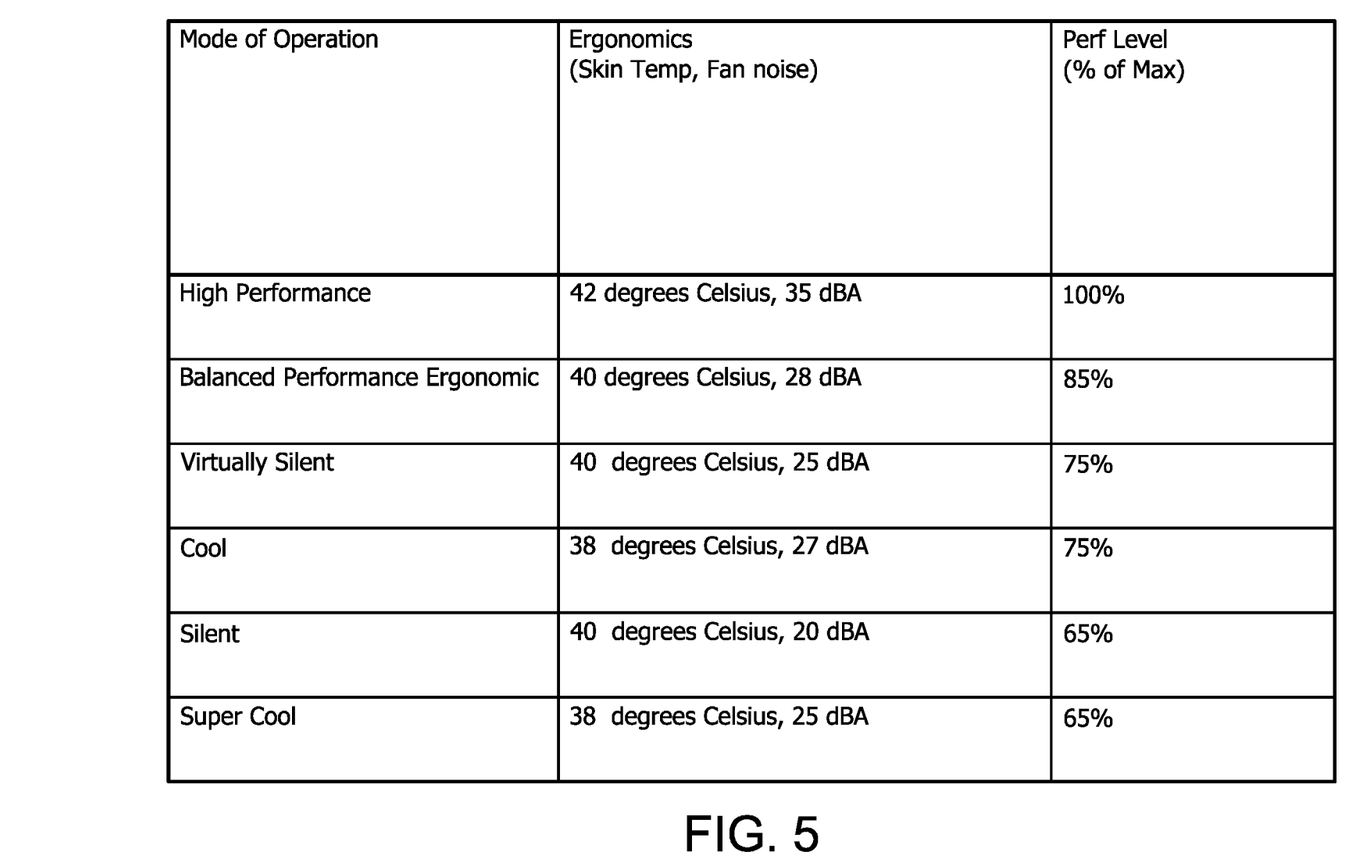
FIG. 5 is a diagram illustrating an example of a plurality of stored modes of operation for a computing device.

FIG. 5 is a diagram illustrating an example of a plurality of stored modes of operation for a computing device (e.g., computing device 300). The number of modes of operation, the types of modes of operation and the parameters used to define the modes of operation in FIG. 5 are merely an example. Features of the present disclosure can include a different number of modes of operation, different types of modes of operation and different parameters used to define the modes of operation than those shown in FIG. 5.

As shown in FIG. 5, six different modes of operation are stored as a set of modes of operation from which to select for a mode of operation of the device. Each modes of operation is one in which the device operates at a different level of performance. Each level of performance includes cooling system parameter settings (e.g., fan power, fan speed and other cooling parameters) which are based on thermal and acoustic ergonomic input parameters. In addition, each level of performance is a percentage of a maximum level of performance. For example, in the High Performance mode of operation shown in FIG. 5, the parameters settings are tuned based on thermal and acoustic ergonomic input parameters (skin temperature of the device and fan noise) such that the cooling system parameters of a particular device will be tuned such that the fan noise is 25 dBA and the cooling system will target a temperature of 42 degrees Celsius, which operates at 100% of the maximum performance level. In the Silent mode of operation shown in FIG. 5, the parameters settings are tuned based on thermal and acoustic ergonomic input parameters (skin temperature and fan noise) such that the cooling system parameters of a particular device will be tuned such that the fan noise is 20 dBA and the cooling system will target a temperature of 40 degrees which operates at 65% of the maximum performance level. The processor is configured to select one of the plurality of modes of operation stored in the memory based on at least one of corresponding input parameter values matching the plurality of monitored input parameter values and corresponding parameter settings matching the parameter settings determined by the processor. For example, although not shown in FIG. 5, each mode of operation can also include corresponding stored input parameter values. The processor can determine the Silent mode of operation by comparing the combination of currently monitored input parameters to the stored input parameter values corresponding to each of the different modes of operation shown in FIG. 5 and determine that the stored input parameter values corresponding to the Silent mode of operation most closely match the plurality of monitored input parameter values. In response, the processor selects the Silent mode of operation. Additionally, or alternatively, the processor determines parameter settings (e.g., 40 degrees Celsius or within a threshold range of 40 degrees Celsius and 25 dBA or within a threshold range of 25 dBA) at block 404 and selects the Silent mode of operation based on the corresponding parameter settings of 40 degrees Celsius and 20 dBA most closely matching the parameter settings determined by the processor at block 404.

The number and type of selectable modes of operation is adaptable to different devices and varies depending on the supporting resources of a device (e.g., type of fan, resources for supporting different power levels at different skin temperatures and other resources).

As shown at block 408 of FIG. 4, the method 400 includes controlling operation of device by tuning parameter settings according to the selected mode of operation. For example, in response to determining that the mode of operation should be switched to a different mode of operation, the processor (e.g., any processor of the device, such as processor 102 or an auxiliary processor 114) controls the operation of the device by tuning one or more parameter settings (e.g., parameter settings of firmware 306 to control operation of a cooling system device, such as fan speed parameters to control operation of a fan) according to the parameter settings stored in the configuration instructions 124 for the selected mode of operation.

For example, in response to a selection of a mode of operation, parameter settings of one or more components 304 of the device 300 are tuned to control operation of the device 300 to manage the efficiency and performance.

In one example, the configuration instructions 124 also includes parameter settings for modes of operation for each of a plurality of identified users 310 operating the device 300. For example, the APD 116 determines, based on the combination of currently monitored input parameters, whether to maintain or switch to a different mode of operation (e.g., a stored mode of operation having input parameters which most closely matches the current plurality of monitored input parameters for an identified user 310), as a mode of operation to be selected. For example, when a specific user 310 is identified, the processor parses the configuration instructions 124 and reads the settings from the configuration instructions 124 for the selected mode of operation and the identified user 310. Tuning is then performed, by setting the values of parameters for a selected mode of operation according to the parameter settings stored in the configuration instructions 124 for the particular user 310. Modes of operation can include parameter settings tailored to an individual user of a device based on the acquired input parameters.

As described above, factors used to manage the efficiency and performance of a computing device can also include costs external to the device. For example, different modes of operation can also be selected for a device based on input parameters received from a network (e.g., wireless network) to also reduce costs external to the device.

Figure 6:
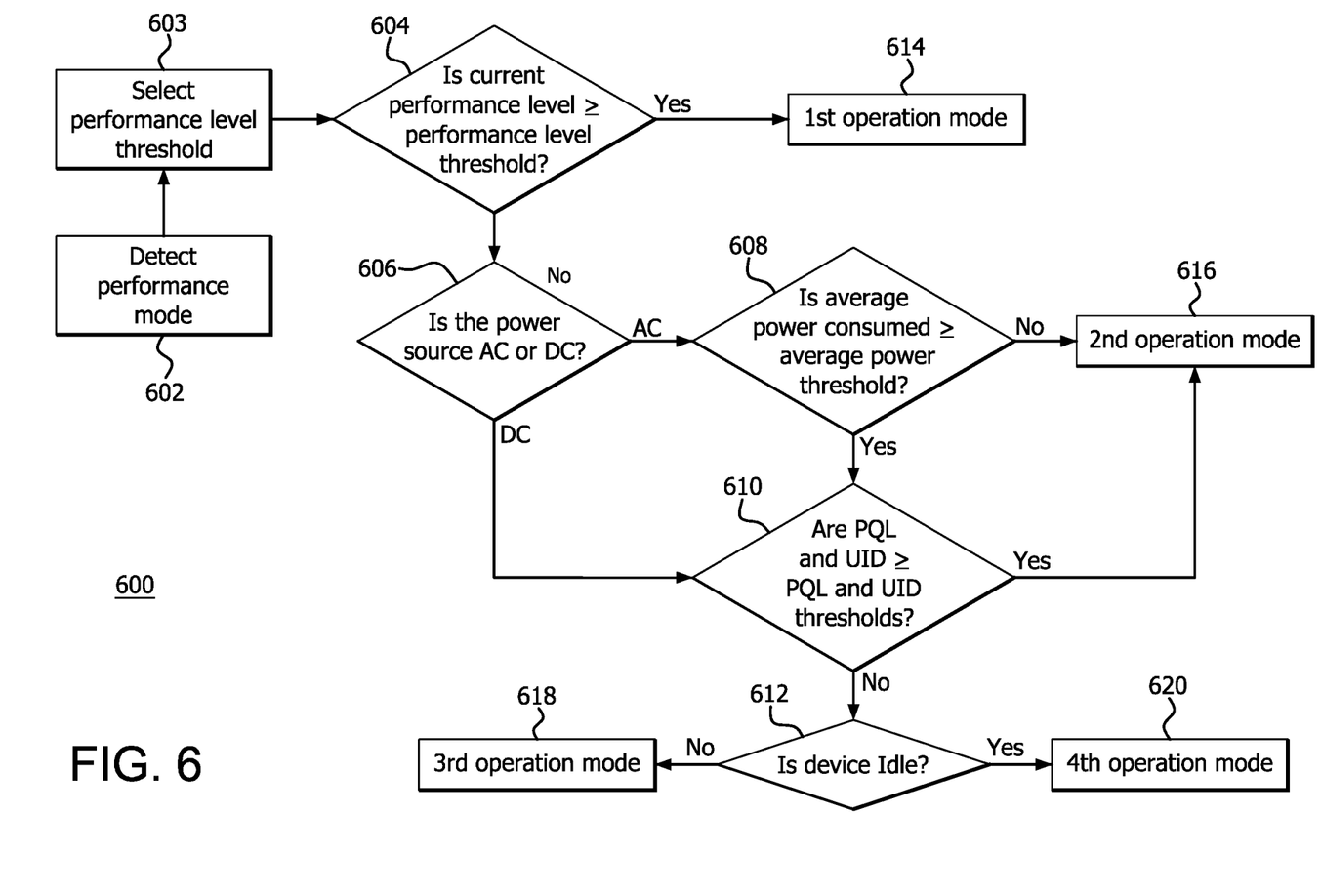
FIG. 6 is a flow diagram illustrating an example method of managing efficiency and performance of a computing device according to features of the present disclosure.

FIG. 6 a flow diagram 600 illustrating an example method of selecting a mode of operation to manage efficiency and performance of a computing device. In the example shown in FIG. 6, the method 600 includes four selectable modes of operation (1st operation mode 614, 2nd operation mode 616, 3rd operation mode 618 and 4th operation mode 620). However, the number of operation modes (e.g., states) shown in FIG. 4 is merely an example. Features of the present disclosure can be implemented using a different number of operation modes than those shown in FIG. 4.

As described in more detail below, a mode of operation (1st operation mode 614, 2nd operation mode 616, 3rd operation mode 618 or 4th operation mode 620) for a device is selected based on the functions and decisions shown at blocks 602-612. The functions and decisions shown in FIG. 6 are merely an example.

The example method shown in FIG. 6 is suitable for managing the efficiency and performance of different devices for various platforms and use cases. However, features of the present disclosure also allow for parameter settings of the different modes of operation to be customized (e.g., vendor specific). For example, parameter settings can be tailored (i.e., tuned to different settings) to a specific device, platform or use case. Additionally, a decision to enter into a specific operation mode to be overridden based on the occurrence of an event (e.g. when the battery charge drops below a threshold percentage).

As shown at block 602, the method includes detecting a performance mode of a device which is used to select a performance level threshold. For example, a processor (e.g., any processor of the device, such as processor 102 or an auxiliary processor 114) detects that the device is either: (1) in a first performance mode in which a single application, executing on the device, is identified as a high performance application (e.g., a type of application which executes using a large number of memory accesses by a processor over a period of time or a number of clock cycles); or (2) in a second performance mode in which multiple applications are currently executing on the device which are not identified as high performance applications (e.g., multi-tasking).

In both cases (i.e., modes) described above, it can appear (e.g., to a processor) that the device is busy, and therefore, warrants that the device be in a high performance mode of operation. However, each mode warrants different performance levels of the device. For example, during a case when multiple applications are executing on the device (e.g., a user is multi-tasking), it can appear (e.g., to the processor) that the device is busy. However, because a large number of resources is not being used to execute these applications (e.g., because the applications are open but not currently executing such that a large number of resources are being used), it is not efficient to enter into a high performance mode of operation (e.g., waste of resources and power). In addition, entering a high performance mode can result in loud fan noise or a high skin temperature of the device, which can be unpleasant to a user of the device.

Alternatively, during a case when a single application executing on the device uses a large number of resources, it is acceptable (e.g., tolerable) to execute the application in a high performance mode (e.g., a high benchmark performance level), despite the device operates at a higher temperature and higher fan speed, in order for the application to be able to access the large number of resources to execute efficiently. The single application executing on the device can be determined to be a type of application which warrants a high level of performance via a look-up table which stores a plurality of identified applications (e.g., via an API) which warrant a high level of performance.

Accordingly, in order to better manage the efficiency and performance of the device, a different performance level threshold (e.g., a threshold number of memory accesses by a processor over a predetermined time period or a predetermined number of clock cycles) is assigned to each performance mode of the device. Each different performance level threshold, assigned to a performance mode, can include a single performance level threshold for the device or multiple performance level thresholds for different processors of the device (e.g., a performance level threshold for a CPU, and a performance level threshold for a GPU).

As shown at block 603 of FIG. 6, a different performance level threshold is selected based on the detected performance mode of the device. For example, in response to detecting that the device is in a first performance mode (in which a single application is identified as an application which executes using a large number of resources) at block 602, the processor selects a higher performance level threshold (assigned to the first performance mode) to be compared to a current performance level (e.g., a number of memory accesses by a processor over a predetermined time period or a predetermined number of clock cycles) of the device for selecting one of the modes of operation 614-620 of the device. Alternatively, in response to detecting that the device is in a second performance mode (in which a multiple applications are executing which do not use a large number of resources), the processor selects a lower performance level threshold to be compared to the current performance level of the device for selecting one of the modes of operation 614-620 of the device.

Which of the modes of operation 614-620 of the device to be selected is determined based on the performance level threshold and a current performance level of the device. For example, as shown at decision block 604, a determination is made as to whether a current performance level (e.g., a number of memory accesses by a processor over a predetermined time period or a predetermined number of clock cycles) is equal to or greater than the selected performance level threshold assigned to the detected performance mode.

The processor (e.g., any processor of the device, such as processor 102 or an auxiliary processor 114) compares the current performance level of the device (e.g., a number of memory accesses by a processor over time or a number of clock cycles) to the performance level threshold. In response to the current performance level of the device being equal to or greater than the performance level threshold (Yes decision), a first mode of operation 614 (mode of operation having a highest level of performance among the plurality of selectable modes of operation 614-620) is selected, by the processor (e.g., any processor of the device, such as processor 102 or an auxiliary processor 114) for the device at block 614. Alternatively, in response to the current performance level of the device being less than the performance level threshold (No decision), the method proceeds to decision block 606 and a determination is made as to whether the present power source supplying power to the device is an alternating current (AC) power source (e.g., plugged in) or a direct current (DC) power source (e.g., battery power).

In the example in which a performance level threshold, assigned to performance mode, includes multiple performance level thresholds for different processors of the device (e.g., a performance level threshold for a CPU, and a performance level threshold for a GPU), the processor compares the current performance level of each processor to the performance level threshold. In response to the current performance level of any of the processors being equal to or greater than the performance level threshold (Yes decision), the first mode of operation 614 is selected. Alternatively, in response to the current performance levels of each of the processors being less than the performance level threshold (No decision), the method proceeds to decision block 606 to determine the type of power source currently supplying power to the device.

In response to the power source being determined to be an AC power source (at block 606), the method proceeds to decision block 608. Alternatively, in response to the power source being determined to be a DC power source (at block 606), the method proceeds to decision block 610.

As shown at decision block 608, a determination is made as to whether an average power consumed by the device (e.g., power consumed by the device over a predetermined period of time or a predetermined number of clock cycles) is equal to or greater than a predetermined average power threshold.

In response to the average power consumed by the device being determined to be equal to or greater than the predetermined average power threshold (No decision), a second mode of operation 616 is selected for the device. The second mode of operation 616 is, for example, a balanced performance and ergonomics mode of operation in which the device operates at a lower fan speed and temperature than the first mode of operation 614 and the ergonomic effects on the user is better (e.g., lower fan noise and cooler temperature) than the first mode of operation 614. The second mode of operation 616 is configured to provide as much performance as possible without sacrificing ergonomic effects (e.g., lower fan noise and cooler skin temperature of a device) to a user. Alternatively, in response to the average power consumed by the device being less than a predetermined average power threshold (Yes decision), the method proceeds to block 610.

As shown at decision block 610, a determination is made as to whether: (1) a processor que length (PQL) (e.g., value assigned for a backlog amount of instructions waiting to be scheduled for execution) is equal to or greater than a predetermined PQL threshold; and (2) a user input delay (UID) (e.g., a latency time interval between a time when a user input is received by a processor to a time when the processor replies or reacts to the user input) is equal to or greater than a predetermined UID threshold.

In response to the either the PQL being equal to or greater than the PQL threshold or the UID being equal to or greater than the UID threshold (Yes decision), the second mode of operation 616 is selected. Alternatively, in response to both the PQL being less than the PQL threshold or the UID being less than the UID threshold, (No decision), the method proceeds to decision block 612.

As shown at decision block 612, a determination is made as to whether the device is idle (e.g., an amount of time a user is away from the keyboard is equal to or greater than a predetermined threshold amount of time).

In response to the device being determined to not be idle (No decision), a third mode of operation 618 is selected for the device. The third mode of operation 616 (e.g., virtually silent mode) is, for example, a mode in which the device operates with very little or no fan speed and a cooler temperature than the second mode of operation such that the ergonomic effects to the user are even better (e.g., virtually no fan noise and cooler temperature) than the second mode of operation. Alternatively, in response to the device being determined to be idle (Yes decision), a fourth mode of operation 620 is selected for the device. The fourth mode of operation (e.g., non-interactive mode) is, for example, a mode in which the device operates at a level that no power is provided to the fan and the ergonomic effects to the user are even better (e.g., no fan noise and very cool temperature) than the third mode of operation.

Figure 7:
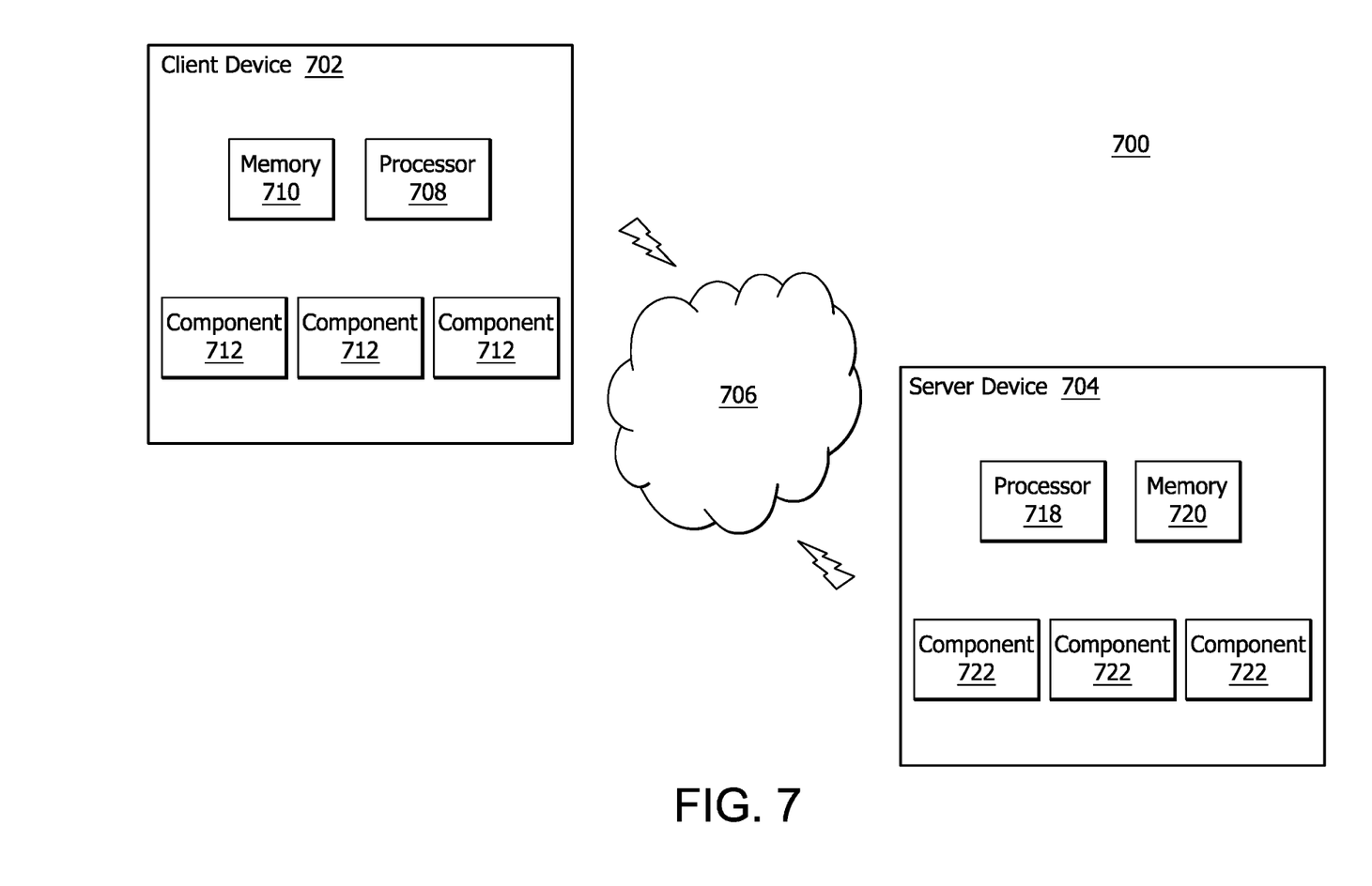
FIG. 7 is an example of a network in which features of the present disclosure can be implemented.

FIG. 7 is an example of a network 700 in which features of the present disclosure can be implemented. As shown in FIG. 7, the network 700 includes a client device 702 and a server device 704 and a network 706.

The client device 702 includes a processor 708, memory 710 and components 712. Processor 708 is, for example, a CPU or another processor. The components 712 include, for example, a processor (e.g., APD 116) and peripheral devices (e.g., input peripheral devices, output peripheral devices and storage devices). The client device 702 is, for example, an end user device which is configured to receive information (e.g., streaming video) from the server device 704 via the network 706.

The server device 704 also includes a processor 718, memory 720 and components 722. Processor 718 is, for example, a CPU or another processor. The components 722 include, for example, a processor (e.g., APD 116) and peripheral devices (e.g., input peripheral devices, output peripheral devices and storage devices). The server device is, for example, a device used to provide information (e.g., streaming video) to the client device 702.

The network 706 includes, for example, a wireless network (e.g., via WiFi, Bluetooth, cellular and other wireless standards), a wired (e.g., Ethernet, fiber optics, cable, and the like) or combination of wired and wireless networks, and decodes the video to be displayed.

The server device 704 is, for example, configured to test the bandwidth of end user devices, such as client device 702 to maintain a quality of service of providing streaming video to the end user devices. If it is determined that the bandwidth capability of the client device 702 is a lower bandwidth, costs at the server device 704 can be efficiently managed (e.g., reduced) by providing a lower resolution video to the client device 702 as compared to higher cost of providing a higher resolution video to the client device 702. For example, the lower resolution video data can be sampled at a lower sampling rate (e.g., 60 kHz) at the server device 704 than the sampling rate (e.g., 120 kHz) for higher resolution video data. Accordingly, additional resources (processors, processor cores, memory, and bandwidth) can be freed up for other functions.

The client device 702 is configured to receive information (e.g., streaming video) from the server device 704. That is, in addition to the acquired input parameters (e.g., input parameters acquired by operating system 120, components 304, sensors 312, sensor fusion hub 314, PMFW 316 and EC+BIOS 318 shown in FIG. 3) which contribute to a performance of the client device 702, the processor 708 determines a mode of operation using additional parameters (e.g., network input parameters from server device 704 and/or network 706) which contribute to a performance of the server device 704.

Factors contributing to the performance of the server device 704 include, for example, a cost for the server device 704 to process and provide lower resolution video data (e.g., lower sampling rate, freeing up additional resources at the server device and power consumption at the server device 704. Factors for controlling and managing the efficiency and performance of the device also include determining (e.g., weighing) the opportunity costs of setting one or more parameters versus one or more other parameters. For example, the determination of which mode of operation to select includes the cost of using resources (e.g., processor, memory, bandwidth or other resources) to perform functions and free up other resources to perform other functions.

It should be understood that many variations are possible based on the disclosure herein. Although features and elements are described above in particular combinations, each feature or element can be used alone without the other features and elements or in various combinations with or without other features and elements.

The methods provided include implementation in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the present disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a ROM, a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device comprising:
   memory; and
   a processor, in communication with the memory, configured to:
   acquire monitored input parameter values;
   detect a performance mode of the computing device;
   select a performance level threshold of the computing device based on the detected performance mode;
   select one of a plurality of modes of operation of the computing device based on the performance level threshold and a current performance level of the device; and
   control operation of the computing device by tuning parameter settings of the computing device according to the selected mode of operation.

2. The computing device of claim 1, wherein the processor is configured to detect between:
a first performance mode of the computing device in which a single application, executing on the device, is identified as a high performance application; and
a second performance mode of the computing device in which multiple applications are currently executing on the computing device which are not identified as high performance applications.

3. The computing device of claim 2, wherein,
in response to detecting the first performance mode of the device, the processor selects, as the performance level threshold, a first performance level threshold; and
in response to detecting the second performance mode of the device, the processor selects, as the performance level threshold, a second performance level threshold.

4. The computing device of claim 3, wherein,
in response to determining that a current performance level of the computing device is equal to or greater than the first performance level threshold, the processor selects, as the mode of operation of the device, a first mode of operation having a highest level of performance among a plurality of selectable modes of operation; and
in response to determining that the current performance level of the computing device is less than the first performance level threshold, the processor selects, as the mode of operation of the device, another one of the plurality of selectable modes of operation, each having a lower level of performance than the first mode of operation.

5. The computing device of claim 4, wherein,
in response to determining that the current performance level of the computing device is equal to or greater than the first performance level threshold, the processor selects, as the mode of operation of the device, the another one of the plurality of selectable modes of operation based on at least one of a type of power source currently supplying power to the device, an average power consumed by the device, a current processor que length and a user input delay.

6. The computing device of claim 1, further comprising a display device, wherein the processor is configured to control operation of the computing device by tuning parameter settings of the display device according to the selected mode of operation.

7. The computing device of claim 1, wherein the memory comprises system-state management instructions which interface between an operating system (OS) of the computing device and firmware of the computing device comprising the parameter settings, and the processor is configured to select the one of the plurality of modes of operation of the computing device by executing the system-state management instructions.

8. A method for managing efficiency and performance of a computing device, the method comprising:
acquiring monitored input parameter values;
detecting a performance mode of the device;
selecting a performance level threshold of the computing device based on the detected performance mode;
selecting one of a plurality of modes of operation of the computing device based on the performance level threshold and a current performance level of the device; and
controlling operation of the computing device by tuning parameter settings of the computing device according to the selected mode of operation.

9. The method of claim 8, further comprising detecting between:
a first performance mode of the computing device in which a single application, executing on the device, is identified as a high performance application; and
a second performance mode of the computing device in which multiple applications are currently executing on the computing device which are not identified as high performance applications.

10. The method of claim 9, further comprising:
in response to detecting the first performance mode of the device, selecting a first performance level threshold; and
in response to detecting the second performance mode of the device, selecting a second performance level threshold.

11. The method of claim 10, further comprising:
in response to determining that a current performance level of the computing device is equal to or greater than the first performance level threshold, selecting a first mode of operation having a highest level of performance among a plurality of selectable modes of operation; and
in response to determining that the current performance level of the computing device is less than the first performance level threshold, selecting another one of the plurality of selectable modes of operation, each having a lower level of performance than the first mode of operation.

12. The method of claim 8, further comprising selecting the one of the plurality of modes of operation of the computing device by executing system-state management instructions which interface between an operating system (OS) of the computing device and firmware of the device comprising the parameter settings.

* * * * *